(12) United States Patent
Kawamura

(10) Patent No.: US 10,199,980 B2
(45) Date of Patent: Feb. 5, 2019

(54) ELECTRIC POWER CONTROL METHOD AND ELECTRIC POWER CONTROL DEVICE

(71) Applicant: NISSAN MOTOR CO., LTD., Yokohama-shi, Kanagawa (JP)

(72) Inventor: Hiromichi Kawamura, Kanagawa (JP)

(73) Assignee: NISSAN MOTOR CO., LTD., Yokohama-shi (JP)

(*) Notice: Subject to any disclaimer, the term of this patent is extended or adjusted under 35 U.S.C. 154(b) by 0 days.

(21) Appl. No.: 15/763,539

(22) PCT Filed: Sep. 30, 2015

(86) PCT No.: PCT/JP2015/077807
§ 371 (c)(1),
(2) Date: Mar. 27, 2018

(87) PCT Pub. No.: WO2017/056258
PCT Pub. Date: Apr. 6, 2017

(65) Prior Publication Data
US 2018/0278194 A1 Sep. 27, 2018

(51) Int. Cl.
*H02P 6/08* (2016.01)
*H02P 27/08* (2006.01)
(Continued)

(52) U.S. Cl.
CPC ............ *H02P 27/085* (2013.01); *H02P 21/22* (2016.02); *H02P 27/05* (2013.01); *H02P 27/06* (2013.01)

(58) Field of Classification Search
CPC .......... H02P 27/08; H02P 27/06; H02P 21/22; H02P 27/085; H02P 6/15; H02P 27/05; H02M 7/5395
See application file for complete search history.

(56) References Cited

U.S. PATENT DOCUMENTS 7,436,144 B2 * 10/2008 Yoshimura ........ H02M 7/53873
318/432
8,222,857 B2 * 7/2012 Kitanaka ............. H02P 21/0021
318/811
(Continued)

FOREIGN PATENT DOCUMENTS

JP 2009-100599 A 5/2009
JP 2009-136125 A 6/2009
(Continued)

OTHER PUBLICATIONS

Hajime Kubo et al., Variable Carrier Frequency Mixed PWM Technique Based on Current Rippie Prediction for Reduced Switching Loss, The 2014 International Power Electronics Conference (IPEC-Hiroshima 2014—ECCE Asia), May 1, 2014, pp. 1601-1605.

*Primary Examiner* — Thai Dinh
(74) *Attorney, Agent, or Firm* — Foley & Lardner LLP

(57) ABSTRACT

An electric power control method includes determining whether to change an operation period within which the operating is performed so as to be longer than one cycle of the carrier wave or not; reducing the switching operation of the switching elements in a first half cycle of the carrier wave; changing a slope of the carrier wave in an intermediate period between the first half cycle of the carrier wave and a last half cycle of the carrier wave in the operation period after the change to compare the carrier wave with the duty command value in magnitude; performing the switching operation of the switching elements according to a result of the comparison; and reducing the switching operation of the switching elements in the last half cycle of the carrier wave.

9 Claims, 9 Drawing Sheets

(51) Int. Cl.
    *H02P 27/06*    (2006.01)
    *H02P 27/05*    (2006.01)
    *H02P 21/22*    (2016.01)

(56) References Cited

U.S. PATENT DOCUMENTS

| | | | |
|---|---|---|---|
| 8,525,455 B2 * | 9/2013 | Takamatsu | H02P 25/024 |
| | | | 318/400.06 |
| 9,018,871 B2 | 4/2015 | Ashida et al. | |
| 9,438,107 B2 * | 9/2016 | Sasaki | H02M 3/156 |
| 9,960,726 B1 * | 5/2018 | Degner | H02P 27/08 |

FOREIGN PATENT DOCUMENTS

| | | | |
|---|---|---|---|
| JP | 2012-110088 A | 6/2012 | |
| JP | 2012-235619 A | 11/2012 | |

* cited by examiner 14-01159(PCT-1767)

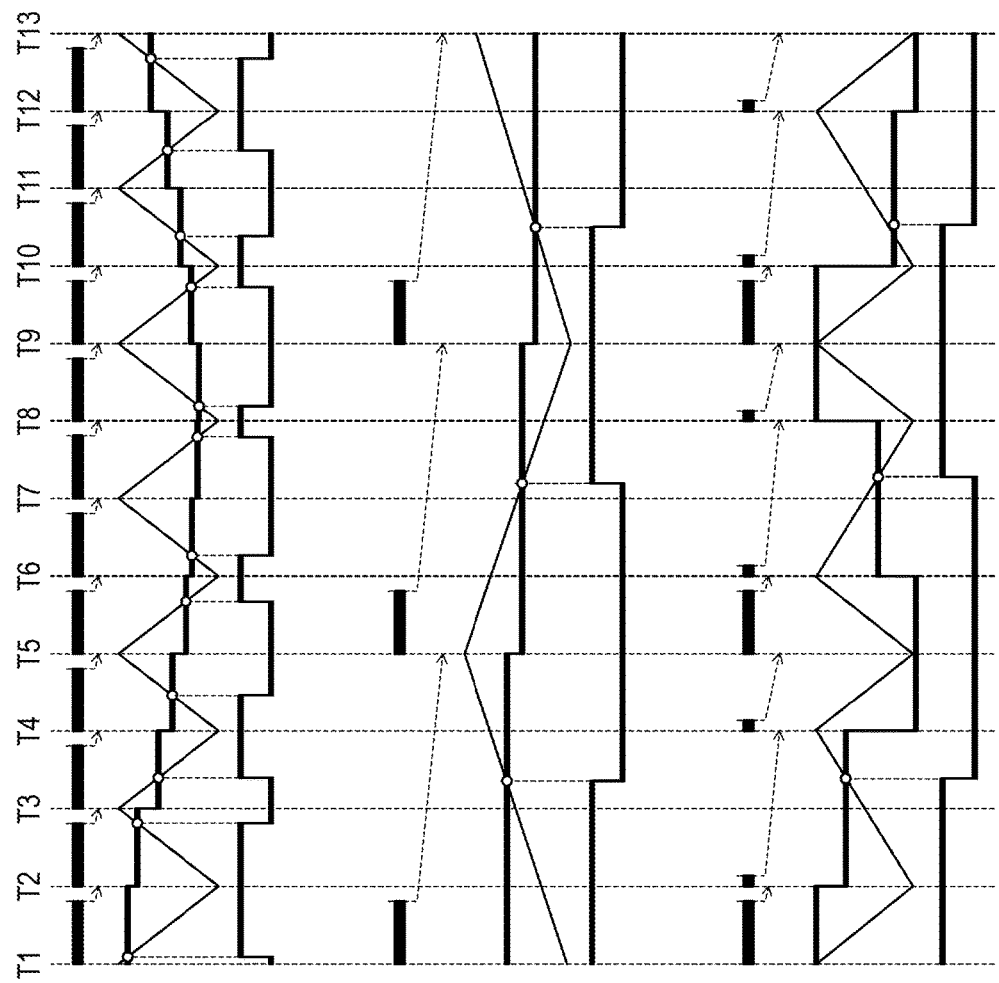

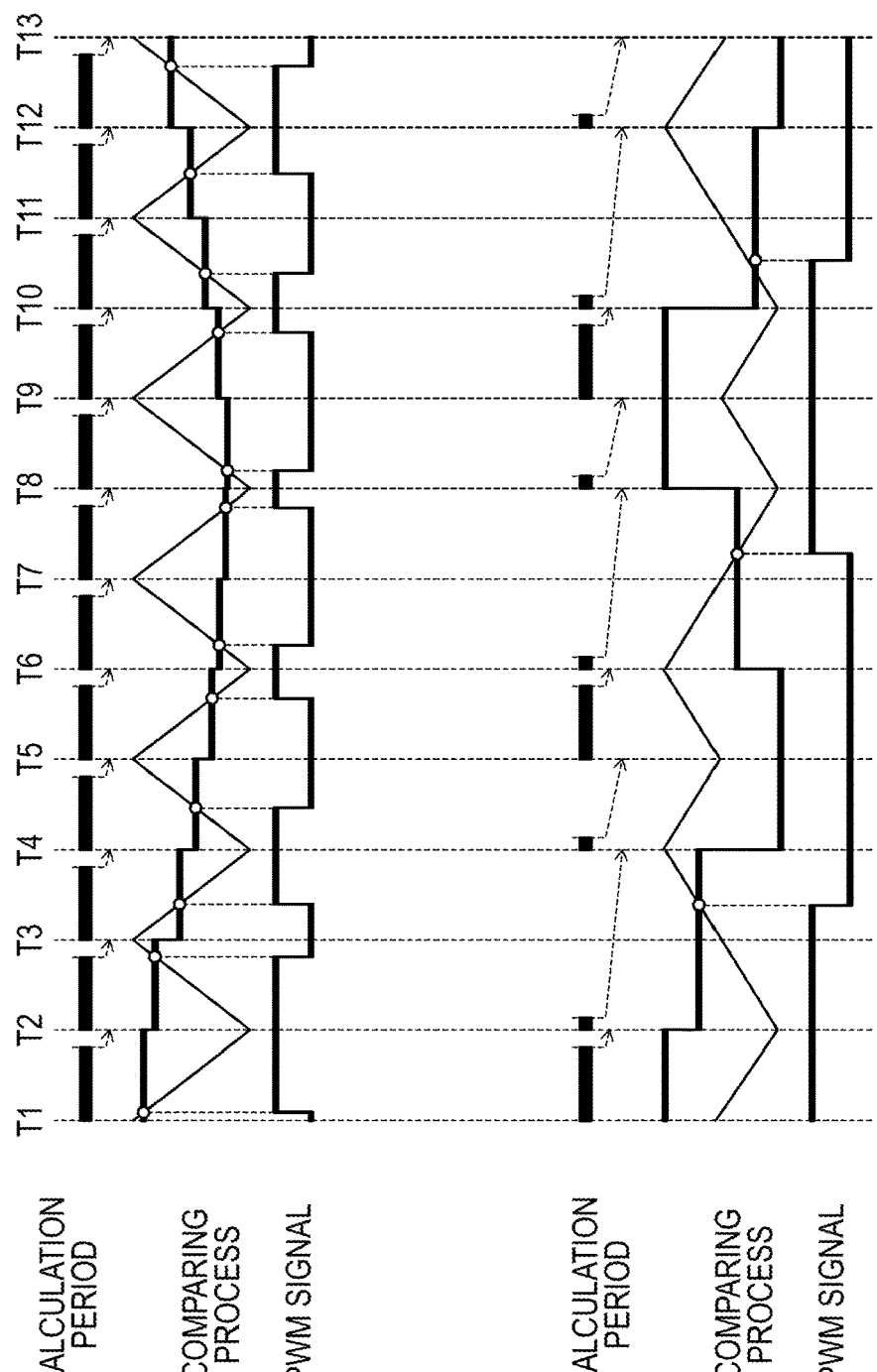

ELECTRIC POWER CONTROL METHOD AND ELECTRIC POWER CONTROL DEVICE

TECHNICAL FIELD

The present invention relates to an electric power control method and an electric power control device.

BACKGROUND ART

There has been known a Pulse Width Modulation (PWM) electric power control method as one of an electric power control method that converts a DC power into an AC power and applies the AC power to a three-phase AC motor.

The general PWM electric power control method sequentially measures a current supplied to a motor at timing at which a carrier wave becomes the maximum or the minimum and obtains a duty command value according to the measured current and a request torque to the motor. The method compares the duty command value with the carrier wave in magnitude and operates on/off of switching elements in an inverter on the basis of the comparison result. This controls a pulse width of an applied voltage to the motor, supplying a desired electric power to the motor.

A semiconductor chip achieves a process regarding the PWM electric power control method. A temperature range in which the semiconductor chip is stably operable is determined in many cases. Therefore, in the case where a temperature of the semiconductor chip itself becomes high or a similar case, if the semiconductor chip generates heat caused by the operation of the switching elements, the semiconductor chip possibly exceeds the temperature range.

Therefore, a technique disclosed in JP2009-100599A changes a frequency of a carrier wave low to lengthen an operation period during which the operation of the switching elements is possibly performed. This configuration lowers the operation frequency of the switching elements, thereby reducing the heat generation by the semiconductor chip.

SUMMARY OF INVENTION

The above-described PWM electric power control method requires waiting for a period equivalent to the operation period from when a current supplied to a motor is measured until an operation period during which the switching elements are operated according to the measured current starts.

Here, to use the technique disclosed in JP2009-100599A, since this delay time increases by the extension of the operation period, this causes a problem of possibly deteriorating accuracy of a rotation control of the motor.

The present invention has been made focusing on such problem, and the object is to provide an electric power control method and an electric power control device that ensure enhancing accuracy of a rotation control of a motor.

According to one embodiment an electric power control method of the of this invention, the electric power control method that controls an electric power supplied to a motor, the electric power control method comprising: a current measuring step of measuring a current supplied to the motor at timing at which a carrier wave becomes a maximum or a minimum; a command value calculating step of calculating a duty command value according to the measured current in the current measuring step and a request torque to the motor; an operating step of comparing the carrier wave with the duty command value in magnitude while the carrier wave monotonously changes from one of the maximum value and the minimum value to the other, the operating step performing a switching operation of switching elements according to a result of the comparison; a determining step of determining whether to change an operation period within which the operating step is performed so as to be longer than one cycle of the carrier wave or not; a first reducing step of reducing the switching operation of the switching elements in a first half cycle of the carrier wave starting from a start timing of the operation period after the change during which the carrier wave monotonously changes when the determining step determines changing the operation period; a comparing step of changing a slope of the carrier wave in an intermediate period between the first half cycle of the carrier wave and a last half cycle of the carrier wave in the operation period after the change to compare the carrier wave with the duty command value in the magnitude, the comparing step performing the switching operation of the switching elements according to a result of the comparison; and a second reducing step of reducing the switching operation of the switching elements in the last half cycle of the carrier wave.

BRIEF DESCRIPTION OF DRAWINGS

FIG. 3 is an explanatory view for a process to change the operation frequency of the switching elements.

FIG. 8 is an explanatory view for a process to change the operation frequency of the switching elements.

DESCRIPTION OF EMBODIMENTS

The following describes embodiments of the present invention with reference to the drawings.

First Embodiment

Figure 1:
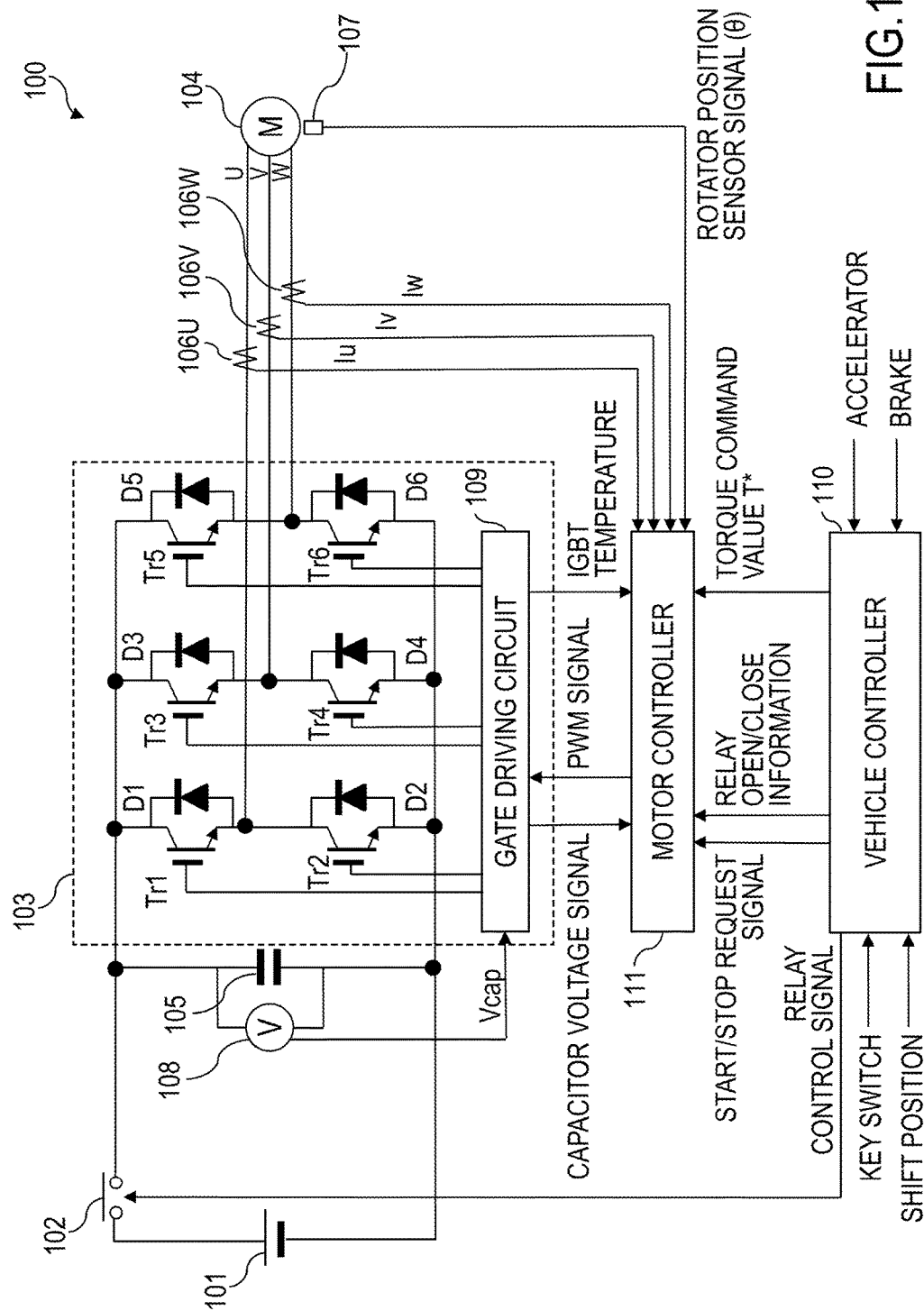
FIG. 1 is a schematic configuration diagram of a power supply system of a first embodiment.

FIG. 1 is a schematic configuration diagram of a power supply system according to the first embodiment.

It is assumed that a power supply system 100 illustrated in FIG. 1 is placed in an electric vehicle. This system supplies an electric power from a battery 101 to a motor 104 via a relay 102 and an inverter 103.

The battery 101 is a secondary battery to output a DC power.

The relay 102 controls driving or a stop of the entire power supply system 100.

The inverter 103 includes a plurality of switching elements (insulated gate bipolar transistors, IGBT) Tr1 to Tr6 and rectifying devices (diodes) D1 to D6. The rectifying devices D1 to D6 are disposed parallel to the respective switching elements Tr1 to Tr6. Additionally, the rectifying devices D1 to D6 are disposed such that a current flows in a direction opposite to a rectification direction of the switching elements Tr1 to Tr6. Each of the two switching elements is coupled in series. Any one of three-phase (UVW) input units of the motor 104 is coupled to between the two switching elements coupled in series.

Specifically, the switching elements Tr1 and Tr2, the switching elements Tr3 and Tr4, and the switching elements Tr5 and Tr6 are each coupled in series. A coupling point of the switching elements Tr1 and Tr2 is coupled to the input unit for the U phase of the motor 104, a coupling point of the switching elements Tr3 and Tr4 is coupled to the input unit for the V phase of the motor 104, and a coupling point of the switching elements Tr5 and Tr6 is coupled to the input unit for the W phase of the motor 104. The switching operation is performed on the switching elements Tr1 to Tr6 thus disposed according to PWM signals output from a motor controller 111 to control a pulse width of a voltage applied from the battery 101 to the motor 104. Such control is generally referred to as a PWM electric power control. It should be noted that the following describes the switching operation of the switching elements Tr by simply referring to the switching operation as the operation of the switching elements Tr.

It should be noted that an electric potential at the input units for the respective phases of the motor 104 while the voltage is not applied to the inverter 103 is assumed as zero. An electric potential difference at a capacitor 105 is Vcap. Therefore, it is assumed that the electric potential of the voltage applied to the input units for the respective phases of the motor 104 is a value in a range of "−Vcap/2" to "+Vcap/2."

The motor 104 is a permanent magnet type three-phase AC motor, which includes a permanent magnet at a rotator, and includes the input units for the respective three-phases (the UVW phases). The motor 104 is a driving source that drives driving wheels of the electric vehicle. The driving wheels of the electric vehicle rotate in accordance with the rotation of the motor 104.

The capacitor 105 is disposed between the relay 102 and the inverter 103 and is coupled in parallel to the inverter 103. The capacitor 105 smoothes the DC power input from the battery 101 to the inverter 103.

A current sensor 106 measures magnitudes of the respective currents flowing from the inverter 103 to the input units for the respective phases of the motor 104. In this embodiment, three current sensors, current sensors 106U, 106V, and 106W are disposed on power lines to the input units for the respective phases of the motor 104. The current sensors 106U, 106V, and 106W perform feedback output of measured three-phase alternating currents Iu, Iv, and Iw at the respective phases to the motor controller 111.

A rotator position sensor 107 is, for example, a resolver and an encoder. The rotator position sensor 107 is disposed near the rotator of the motor 104 to measure a phase θ of the rotator of the motor 104. The rotator position sensor 107 outputs a rotator position sensor signal indicative of the measured phase θ of the rotator to the motor controller 111.

A voltage sensor 108 is disposed parallel to the capacitor 105. The voltage sensor 108 measures the capacitor voltage Vcap as the electric potential difference between both ends of the capacitor 105 and outputs the capacitor voltage Vcap to a gate driving circuit 109.

The gate driving circuit 109 operates the switching elements Tr1 to Tr6 in the inverter 103 according to the PWM signals input from the motor controller 111. The gate driving circuit 109 measures temperatures of the switching elements Tr1 to Tr6 and detects whether the switching elements Tr1 to Tr6 operate normally or not. The gate driving circuit 109 outputs IGBT signals indicative of the measured temperatures, the detected states, or a similar state of the switching elements Tr1 to Tr6 to the motor controller 111. The gate driving circuit 109 outputs a capacitor voltage signal indicative of the capacitor voltage Vcap measured by the voltage sensor 108 to the motor controller 111.

A vehicle controller 110 calculates a torque command value T* indicative of a request torque as a torque requested to the motor 104 and outputs the calculated torque command value T* to the motor controller 111.

The motor controller 111 outputs pulse-width modulation (PWM) signals to the respective switching elements Tr1 to Tr6 in the inverter 103 to control the pulse width of the applied voltage to the motor 104. Specifically, the motor controller 111 calculates a voltage command value on the basis of the three-phase alternating current Iu, Iv, and Iw output from the current sensor 106, the phase θ of the rotator output from the rotator position sensor 107, and the torque command value T* output from the vehicle controller 110. Then, the motor controller 111 uses the voltage command value and the capacitor voltage Vcap output from the voltage sensor 108 to calculate a duty command value. Next, the motor controller 111 compares the duty command value with a carrier wave and generates the PWM signals according to the comparison result. Subsequently, the motor controller 111 outputs the generated PWM signals to the gate driving circuit 109. The gate driving circuit 109 operates the respective switching elements Tr1 to Tr6 in the inverter 103 on the basis of the respective input PWM signals. This controls the pulse width of the applied voltage to the motor 104, allowing the motor 104 to generate the torque at the torque command value T*.

It is assumed that, in the power supply system 100, an electric power control device is constituted of, for example, the inverter 103, the current sensor 106, and the motor controller 111. The motor controller 111 is constituted of a semiconductor chip.

Here, the following describes a method to change an operation frequency of the switching elements Tr by the motor controller 111.

Figure 2A:
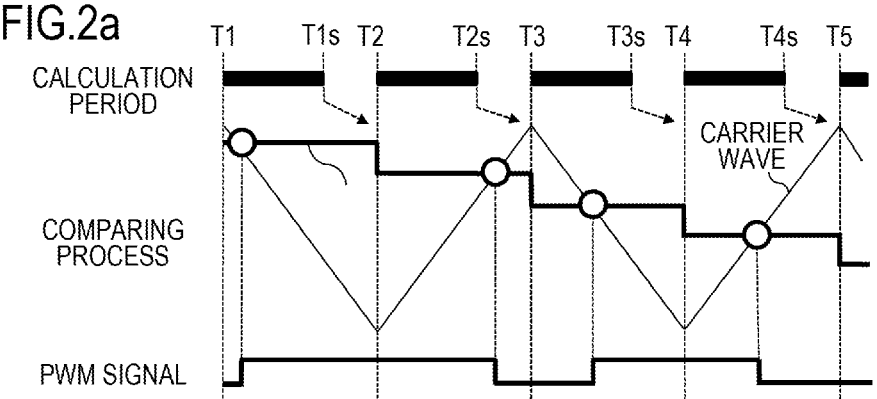
FIG. 2 is an explanatory view for a process to change an operation frequency of switching elements.
Figure 2B:
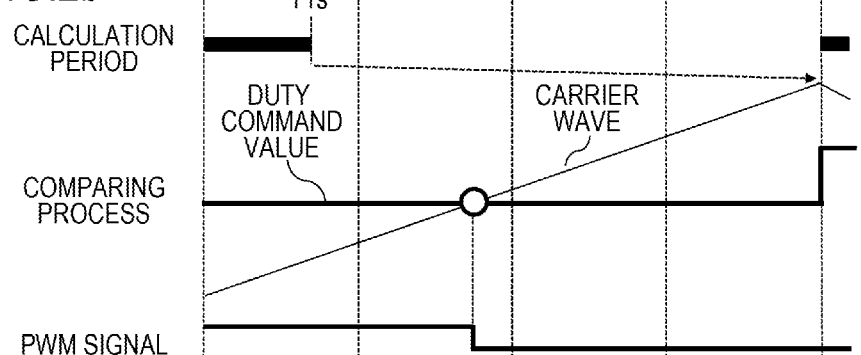
Figure 2C:
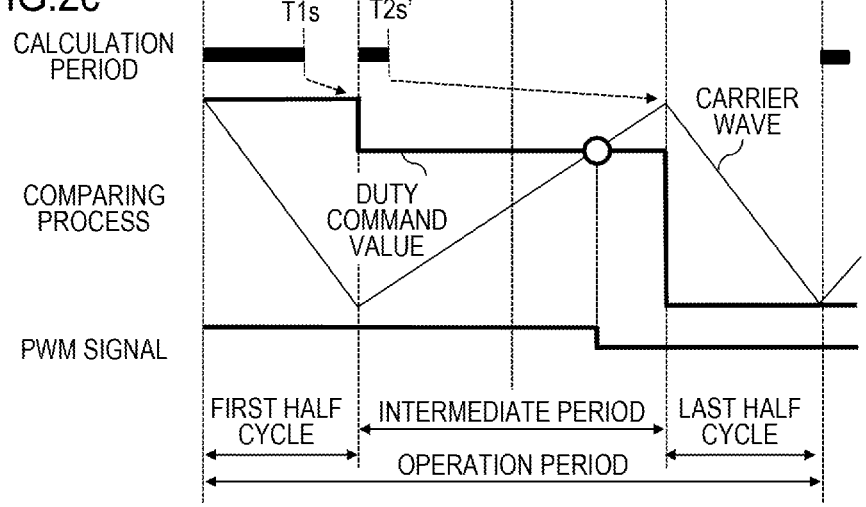

FIG. 2 is an explanatory view for the process to change the operation frequency of the switching elements. FIG. 2(a) illustrates a PWM signal generating process when the operation frequency is not changed. FIG. 2(b) illustrates the PWM signal generating process when the operation frequency is changed by changing the frequency of the carrier wave using prior art. FIG. 2(c) illustrates the PWM signal generating process in the case where the operation frequency is changed by changing a part of a slope of the carrier wave according to the present invention.

FIG. 2(a) to FIG. 2(c) each describes a calculation period, a comparing process, and the PWM signal. The calculation period shows a period during which the motor controller 111 performs a calculating process of the duty command value. The comparing process compares the carrier wave with the duty command value. The PWM signal indicates a high level or a low level signal. The switching elements Tr are operated according to this signal level.

FIG. 2(a) to FIG. 2(c) each illustrates arrows between the calculation period and the comparing process. These arrows indicate a delay from timing at which the calculation of the duty command value is completed until timing at which the comparison between the calculated duty command value and the carrier wave starts.

It should be noted that a period during which the carrier wave whose frequency is not changed monotonously increases or decreases, that is, a period during which the minimum value changes to the maximum value (from the trough to the peak) or from the maximum value to the minimum value (from the peak to the trough) is equivalent to a half of a cycle of the carrier wave. Therefore, the period during which the carrier wave whose frequency is not changed monotonously increases or decreases is referred to as a half cycle of the carrier wave. A period during which the duty command value according to a certain measured current is compared with the carrier wave, and the switching elements Tr are operated according to the comparison results are referred to as an operation period. That is, the switching elements Tr are operated at every operation period.

First, the following describes the PWM signal generating process when the operation frequency of the switching elements Tr is not changed with reference to FIG. 2(a).

A time T1 is timing at which the carrier wave becomes the maximum. The current sensor 106 measures the current at this time T1. The motor controller 111 uses this measured current to start calculating the duty command value used at times T2 and T3. It should be noted that, from the times T1 and T2, the already-calculated duty command value is compared with the carrier wave in the magnitude, and the PWM signal according to the comparison result is generated.

Specifically, in the case where the duty command value is larger than the carrier wave, the PWM signal to turn on the switching elements Tr is generated. Meanwhile, in the case where the duty command value is smaller than the carrier wave, the PWM signal to turn off the switching elements Tr is generated. It should be noted that, circles are given at positions at which the duty command value intersects with the carrier wave and the switching elements Tr are operated at the timings where the circles are given.

At a time T1s, the motor controller 111 completes the calculating process of the duty command value.

The time T2 is timing at which the carrier wave becomes the minimum. The comparison between the duty command value calculated at the time T1s and the carrier wave starts at this time T2.

The above-described operations are repeated after the time T2 as well.

Accordingly, as illustrated in FIG. 2(a), when the operation frequency is not changed, the comparison between the duty command value according to the measured current and the carrier wave and the operation of the switching elements Tr are performed at every half cycle of the carrier wave. Therefore, the operation period is equivalent to the half cycle of the carrier wave.

The following describes the PWM signal generating process in the case where the operation frequency of the carrier wave is changed by changing the frequency of the carrier wave using prior art with reference to FIG. 2(b). Compared with the carrier wave illustrated in FIG. 2(a), the cycle of the carrier wave in this diagram is changed to four times, that is the frequency is changed to ¼ times.

The time T1 is timing at which the carrier wave becomes the maximum. The comparing process between the duty command value and the carrier wave starts from this time T1. The motor controller 111 uses this measured current to start calculating the duty command value used at and after a time T5. It should be noted that, between the times T1 and T5, the already-calculated duty command value is compared with the carrier wave in the magnitude, and the PWM signal according to the comparison result is generated.

The motor controller 111 completes the calculating process of the duty command value at a time T1s.

The time T5 is timing at which the carrier wave becomes the maximum. The comparing process between the duty command value calculated at the time T1s and the carrier wave starts at this time T5.

The above-described operations are repeated after the time T5 as well.

Accordingly, as illustrated in FIG. 2(b), in the case where the frequency of the carrier wave is changed, the duty command value according to the measured current is compared with the carrier wave and the switching elements Tr are operated at every time four times of the half cycle of the carrier wave before changing the frequency. Accordingly, the operation period is equivalent to the period four times of the half cycle of the carrier wave before the change. Thus, compared with the case illustrated in FIG. 2(a), the operation period becomes four times; therefore, the operation frequency can be lowered to ¼ times.

The following describes the PWM signal generating process that changes the operation frequency by changing a part of the slope of the carrier wave according to the present invention with reference to FIG. 2(c). Compared with the carrier wave illustrated in FIG. 2(a), a part of (the times T2 to T4) the slope of the carrier wave in this diagram is changed. In this diagram, it is assumed that the operation period of the switching elements Tr, similar to the operation period illustrated in FIG. 2(b), becomes four times compared with the operation period illustrated in FIG. 2(a). It should be noted that, when the duty command value does not intersect with the carrier wave, the switching elements Tr are assumed to be not operated.

A period of the half cycle of the carrier wave starting from the start timing of the changed operation period during which the carrier wave monotonously changes is referred to as a first half cycle. Meanwhile, a period of the half cycle of the carrier wave ending at an end timing of the operation period is referred to as a last half cycle. A period between the first half cycle and the last half cycle in the operation period is referred to as an intermediate period.

The time T1 is timing at which the carrier wave becomes the maximum and the first half cycle starts. The current sensor 106 measures the current at this time T1. The motor controller 111 uses this measured current to start calculating the duty command value between the times T2 and T4. It should be noted that, the comparing process between the duty command value and the carrier wave starts from the time T1; however, since the duty command value is always equal to or more than the carrier wave at the times T1 and T2, the switching operation of the switching elements is not performed.

At the time T1s, the motor controller 111 completes the calculating process of the duty command value.

The time T2 is timing at which the carrier wave becomes the minimum, and the intermediate period starts at the end of the first half cycle. At this time T2, the slope of the carrier wave is changed such that the carrier wave monotonously increases from the minimum value to the maximum value in the intermediate period. The comparing process between the duty command value calculated at the time T1s and the carrier wave whose slope is changed starts.

Simultaneously, referring to the calculation period in the drawing, at the time T2, the motor controller 111 starts a determining process of the duty command value between the times T4 and T5. It should be noted that, at the time T2, the duty command value is not calculated using the measured current but the duty command value is determined according to whether the slope of the carrier wave is positive or negative in the intermediate period. Specifically, since the slope of the carrier wave in the intermediate period is positive, the minimum value (the low side) of the carrier wave is determined as the duty command value between the times T4 and T5. It should be noted that when the slope of the carrier wave in the intermediate period is negative, the maximum value of the carrier wave (the high side) is determined as the duty command value.

At a time T2s', the motor controller 111 completes the determining process of the duty command value and determines the minimum value of the carrier wave as the duty command value. It should be noted that, a period during which the duty command value is determined according to the gradient of the carrier wave (the times T2 to T2') is shorter than a period during which the duty command value is calculated using the measured current (the times T1 to T1').

The time T4 is timing at which the carrier wave becomes the maximum and the last half cycle starts at the end of the intermediate period. At the time T4, the motor controller 111 starts the comparing process between the duty command value determined at the time T2s' and the carrier wave.

The time T5 is timing at which the carrier wave becomes the minimum, and the first half cycle in the next operation period starts at the end of the last half cycle. At this time T5, the duty command value is not changed. Simultaneously, at the time T5, the current sensor 106 measures the current, and the motor controller 111 starts calculating the duty command value used for the operation of the switching elements Tr in the next operation period on the basis of the measured current.

The above-described operations are repeated after the time T5 as well. It should be noted that, in this explanation, the duty command value is not set at the time T5. However, for example, due to restrictions on a process of the semiconductor chip, there may be a case where any value needs to be set to the duty command value at the timing at which the carrier wave becomes the maximum or the minimum. In such case, the value identical to one at the time T2 is set to the duty command value at the time T3, and the value identical to one at the time T4 is set to the duty command value at the time T5.

Accordingly, the configuration as illustrated in FIG. 2(c) performs the companion between the duty command value according to the measured current and the carrier wave and the operation of the switching elements Tr at every operation period (the times T1 to T5). It should be noted that, this operation period is equivalent to the period four times of the half cycle of the carrier wave. Thus, compared with the case illustrated in FIG. 2(a), since the operation period becomes four times, the operation frequency can be lowered to ¼ times.

Here, the following summarizes the operations when a part of the slope of the carrier wave is changed as illustrated in FIG. 2(c). The operation period within which the companion between the duty command value according to the measured current and the carrier wave and the operation of the switching elements Tr are performed starts from the measurement timing of the current (the time T1). It should be noted that the half cycle starting from the start timing of the operation period during which the carrier wave monotonously changes (the times T1 and T2) is the first half cycle. Meanwhile, the half cycle ending at the end timing of the operation period during which the monotonous change of the carrier wave ends (the times T4 to T5) is the last half cycle. The period between the first half cycle and the last half cycle in the operation period (the times T2 to T4) is the intermediate period. It should be noted that, in the intermediate period, the carrier wave monotonously changes from one of the minimum value and the maximum value to the other.

In the intermediate period (the times T2 to T4), the switching operation is performed on the switching elements at timing at which the magnitude relationship between the carrier wave and the duty command value according to the measured current is reversed. Meanwhile, in the first half cycle (the times T1 and T2) and the last half cycle (the times T4 to T5), the duty command value is set to the high side or the low side and the magnitude relationship between the duty command value and the carrier wave does not change; therefore, the switching operation is not performed on the switching elements. Accordingly, in the operation period after the change (the times T1 to T5), the switching operation is performed on the switching elements Tr only in the intermediate period (the times T2 to T4). Thus, since the switching operation is performed on the switching elements Tr at every operation period after the change, the operation frequency of the switching elements Tr can be lowered.

FIG. 3 is an explanatory view for the changing process of the operation frequency of the switching elements. Similar to FIG. 2, FIG. 3(a) in FIG. 3 is an explanatory view for the PWM signal generating process when the operation frequency is not changed. FIG. 3(b) is an explanatory view for the PWM signal generating process when the frequency of the carrier wave is changed using prior art. FIG. 3(c) is an explanatory view for the PWM signal generating process when a part of the slope of the carrier wave is changed according to the present invention. This diagram illustrates the PWM signal generating process in a period longer than the period in FIG. 2.

To change the frequency illustrated in FIG. 3(b) and to change a part of the slope of the carrier wave illustrated in FIG. 3(c), the switching elements Tr are operated at every period four times of the half cycle of the carrier wave before the change.

When a part of the slope of the carrier wave is changed, in the case where the slope of the carrier wave in the intermediate period in the first half cycle is positive, the duty command value becomes the maximum value of the carrier wave and in the case where the slope is negative, the duty command value becomes the minimum value of the carrier wave. Meanwhile, in the case where the slope of the carrier wave in the intermediate period in the last half cycle is positive, the duty command value becomes the minimum value of the carrier wave and in the case where the slope is negative, the duty command value becomes the maximum value of the carrier wave. Thus, the following specifically describes the setting operations of the duty command value with reference to FIG. 3(c).

With reference to the operation period from the times T1 to T5, since the slope of the carrier wave in the intermediate period (the times T2 to T) is positive, the minimum value of the carrier wave is set to the duty command value in the last half cycle (the times T4 and T5). With reference to the next operation period (times T5 to T9), the duty command value remains the minimum value of the carrier wave in the first half cycle (the times T5 and T6) and is not changed. This value is a value according to the negative slope of the carrier wave in the intermediate period (the times T6 to T8).

Accordingly, the motor controller 111 sets one of the maximum value or the minimum value of the carrier wave according to the slope in the intermediate period to the duty command value at the end timing of the intermediate period in a certain operation period. This configuration sets the duty command value to the value according to the slope of the carrier wave in the intermediate period in the last half cycle in the certain operation period. This duty command value is used without change in the first half cycle in the next operation period as well. This configuration sets the duty command value in the first half cycle in the next operation period to the value according to the slope of the carrier wave in the intermediate period.

Here, the following describes the relationship between the duty command value and the duty ratio when the operation frequency is not changed as illustrated in FIG. 2(a) and FIG. 3(a) and when the frequency of the carrier wave is changed as illustrated in FIG. 2(b) and FIG. 3(b). It should be noted that the duty ratio means a ratio of an ON section of the PWM signal to the operation cycle of the switching elements Tr.

Figure 4A:
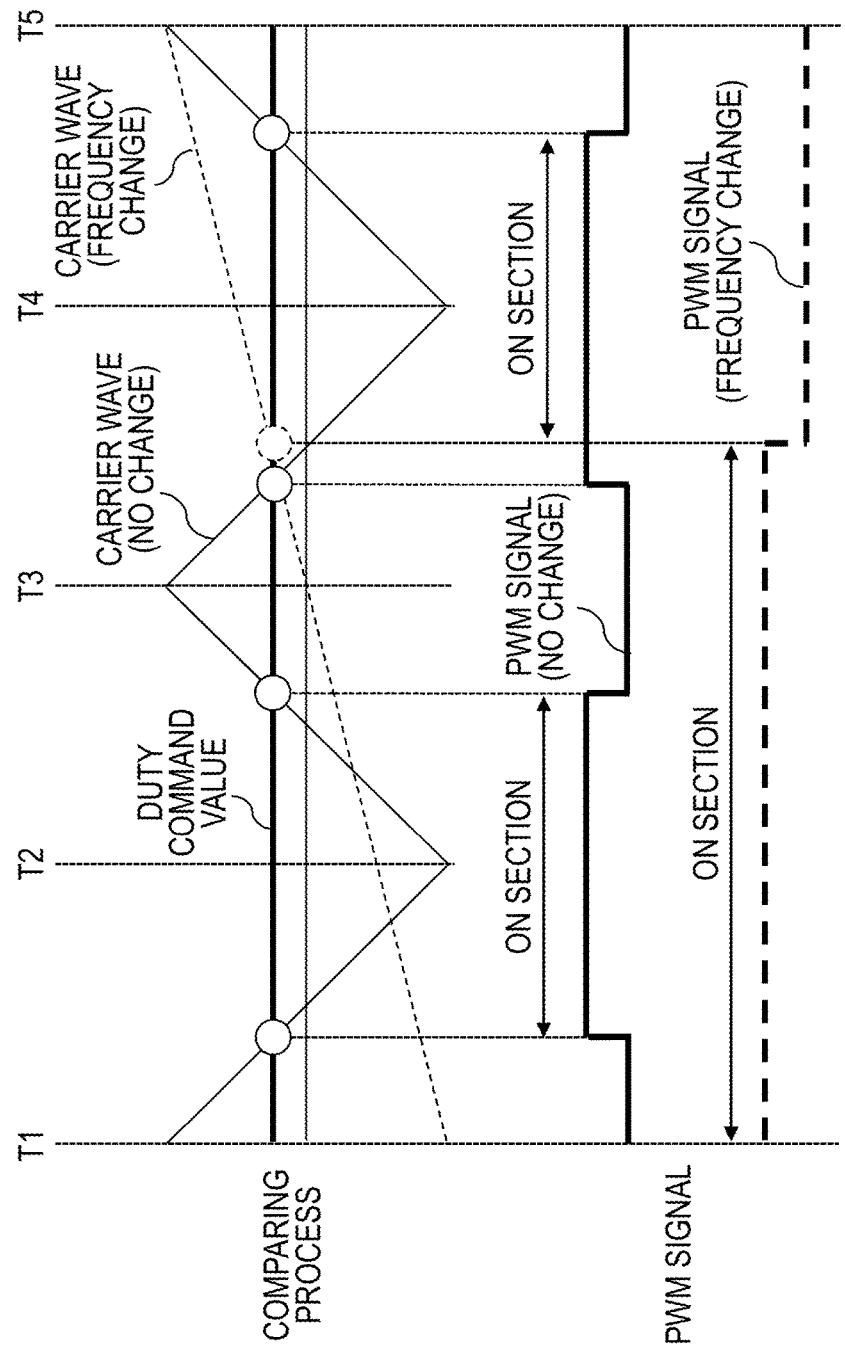
FIG. 4A is a drawing illustrating one example of a comparing process and a PWM signal.

FIG. 4A is a drawing illustrating one example of the comparing process and the PWM signal.

In the comparing process in this diagram, the carrier wave whose operation frequency is not changed is indicated by the solid line. The carrier wave whose frequency is changed is indicated by the dotted line. It should be noted that the duty command values are identical in both cases of not changing the operation frequency and changing the frequency and are indicated by the solid line.

In the PWM signal in this diagram, the PWM signal when the operation frequency is not changed is indicated by the thick solid line. The PWM signal when the frequency is changed is indicated by the thick dotted line.

The duty ratio when the operation cycle is not changed is a sum total of the ON section of the PWM signal, which is equal to the duty ratio when the frequency is changed. This is because, even if the gradient of the carrier wave is different, as long as the carrier wave repeatedly changes between the maximum value and the minimum value at a constant cycle, the sum total of the section where the duty command value becomes larger than the carrier wave becomes equal to the duty ratio.

Accordingly, to change the frequency as illustrated in FIG. 2(b) and FIG. 3(b), using the calculated duty command value as it is allows setting the duty ratio to a desired value.

The following describes the relationship between the duty command value and the duty ratio when the frequency is changed as illustrated in FIG. 2(b) and FIG. 3(b) and a part of the slope of the carrier wave is changed as illustrated in FIG. 2(c) and FIG. 3(c).

Figure 4B:
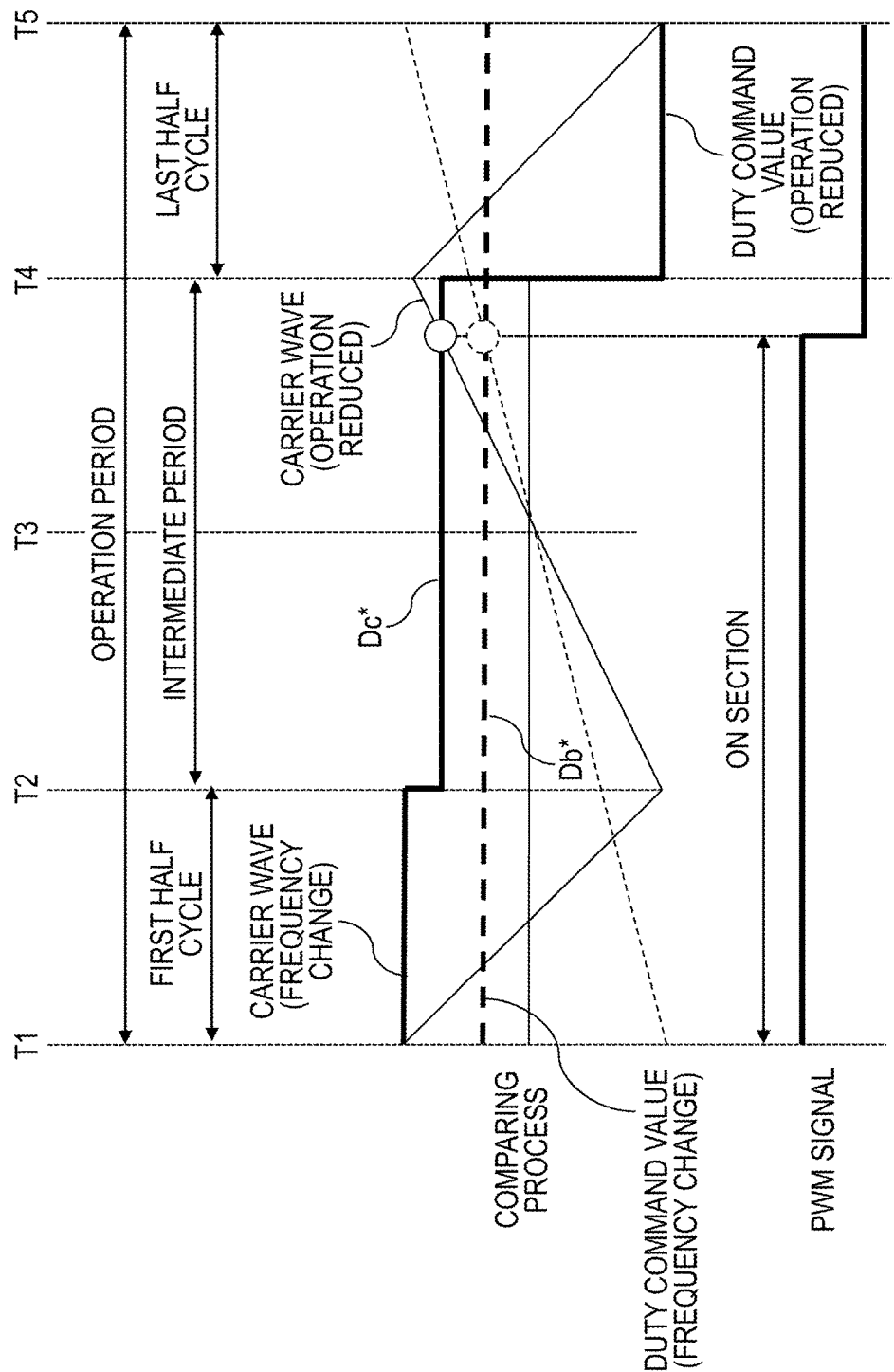
FIG. 4B is a drawing illustrating one example of the comparing process and the PWM signal.

FIG. 4B is a drawing illustrating another example of the comparing process and the PWM signal.

In the comparing process in this diagram, regarding the case of changing the frequency, the duty command value is indicated by the thick dotted line and the carrier wave is indicated by the dotted line. It should be noted that this duty command value is Db*. This diagram illustrates, in the case where the operation of the switching elements is reduced, the duty command value is indicated by the thick solid line and the carrier wave is indicated by the solid line. It should be noted that the duty command value in the times T2 to T4 (the intermediate period) among the duty command values is assumed as Dc*.

In the PWM signal in this diagram, the PWM signals when the operation frequency is not changed and when the frequency is changed match, which is indicated by the solid line.

Here, to equalize the duty ratio when the frequency is changed and when the operation of the switching elements Tr is reduced, the operation timing of the switching elements Tr needs to be matched. Therefore, the duty command value Dc* needs to have the magnitude twice as large as the duty command value Db*. This is because, to reduce the operation of the switching elements, compared with the case of changing the frequency, the slope of the carrier wave in the intermediate period is twice. It should be noted that the factor of this slope can be obtained by dividing the operation period by the intermediate period.

Accordingly, to reduce the operation of the switching elements, correcting the calculated duty command value to twice of the value obtained by dividing the operation period by the comparison period, thus ensuring setting the duty ratio to the desired value.

It should be noted that expressing the factor of the operation period to the half cycle of the carrier wave as a change factor K (K=4 in FIG. 2(b) and FIG. 2(c), FIG. 3(b) and FIG. 3(c), and FIG. 4A and FIG. 4B), the operation period after the change becomes "K−2" times of the half cycle of the carrier wave before the change. Therefore, a correction factor of the duty command value becomes "K/(K−2) times."

Figure 5:
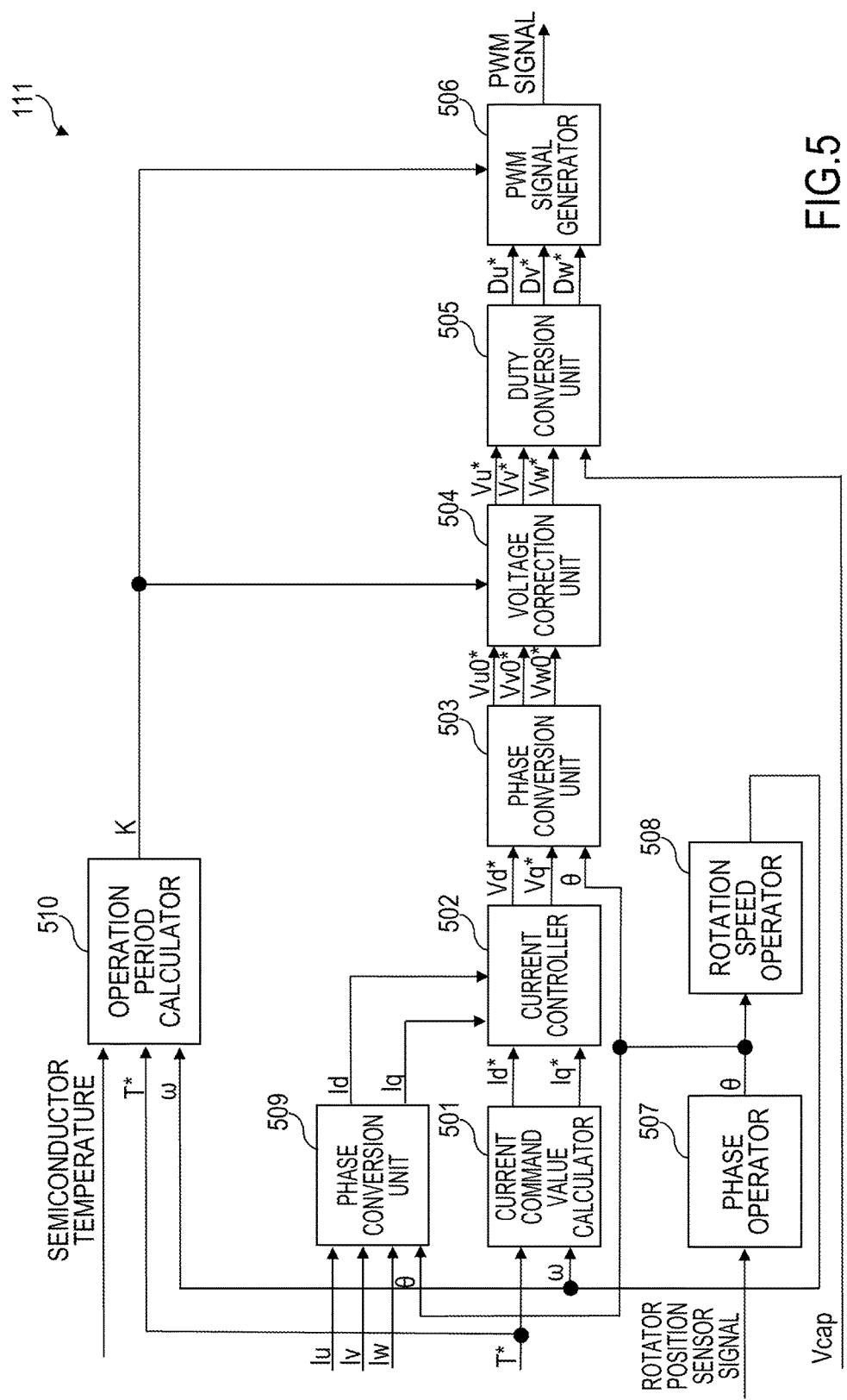
FIG. 5 is a block diagram illustrating a configuration of a motor controller.

The following describes the configuration of the motor controller 111 in FIG. 1 with reference to FIG. 5.

FIG. 5 is a block diagram illustrating the configuration of the motor controller 111.

A current command value calculator 501 calculates a d-axis current command value Id* and a q-axis current command value Iq* on the basis of the torque command value T*, which is calculated by the vehicle controller 110 in FIG. 1, and a rotation speed ω of the motor 104.

It should be noted that the rotation speed ω of the motor 104 is obtained as follows.

A phase operator 507 calculates a rotator phase θ on the basis of a rotator position sensor signal output from the rotator position sensor 107 in FIG. 1.

A rotation speed operator 508 performs a differential operation on the rotator phase θ calculated by the phase operator 507 to operate the rotation speed (an electric angle speed) ω.

To a current controller 502, the d-axis current command value Id* and the q-axis current command value Iq*, which are output from the current command value calculator 501, and a d-axis current Id and a q-axis current Iq, which are measured value of a current flowing from a phase conversion unit 509 to the motor 104, are input. The current controller 502 calculates a d-axis voltage command value Vd* and a q-axis voltage command value Vq* on the basis of these input values. Specifically, the current controller 502 obtains the d-axis voltage command value Vd* so as to eliminate the deviation between the d-axis current command value Id* and the d-axis current Id. The current controller 502 obtains the q-axis voltage command value Vq* so as to eliminate the deviation between the q-axis current command value Iq* and the q-axis current Iq.

Here, when a voltage command value largely changes, there may be a case where the time is required from when the voltage command value is changed to a target value until the applied voltage to the motor 104 actually becomes the target value. Thus, the state from when the command value is changed until the actual value is reflected is referred to as a transient state. Therefore, performing a gain control process on the voltage command value as described later at timing where the voltage command value largely changes ensures shorting the period in the transient state.

It should be noted that the phase conversion unit 509 calculates the d-axis current Id and the q-axis current Iq on the basis of the three-phase alternating currents Iu, Iv, and Iw measured by the current sensors 106U, 106V, and 106W in FIG. 1 and the rotator phase θ calculated by the phase operator 507.

It should be noted that the timing at which the current sensor 106 measures the magnitude of the carrier wave and the timing at which the d-axis current Id and the q-axis current Iq output from the phase conversion unit 509 change are synchronized. For example, when the current sensor 106 measures the current flowing to the motor 104 at the timing at which the carrier wave has the maximum magnitude, the d-axis current Id and the q-axis current Iq output from the phase conversion unit 509 change synchronized with the timing at which the magnitude of the carrier wave becomes the maximum.

A phase conversion unit 503 uses the d-axis voltage command value Vd* and the q-axis voltage command value Vq* and the phase θ of the rotator of the motor 104 output from the phase operator 507 to obtain three-phase alternating-current voltage command values Vu0*, Vv0*, and Vw0*. The phase conversion unit 503 outputs the obtained three-phase alternating-current voltage command values Vu0*, Vv0*, and Vw0 to a voltage correction unit 504.

As described above, the electric potential supplied to the input units for the respective phases of the motor 104 is in a range of "−Vcap/2" to "+Vcap/2." Accordingly, three-phase alternating-current voltage command values Vu*, Vv*, and Vw* become in a range from "−Vcap/2" to "+Vcap/2."

From the phase conversion unit 503 and an operation period calculator 510, the three-phase alternating-current voltage command values Vu0*, Vv0*, and Vw0* and the change factor K of a switching cycle are input to the voltage correction unit 504, respectively. As described with reference to FIG. 4B, the voltage correction unit 504 multiplies the respective three-phase alternating-current voltage command values Vu0*, Vv0*, and Vw0* by "K/(K−2)" to set after-correction voltage command values Vu*, Vv*, and Vw*.

Here, as described above, there is the state referred to as the transient state from when the voltage command value is changed until the applied voltage becomes the value. The voltage correction unit 504 thus performs the correction sets the operation timing of the switching elements Tr to the desired timing, thereby allowing enhancing current control performance including the transient state.

It should be noted that the correction by the voltage correction unit 504 needs not to be performed. In such case, the current control performance in the transient state deteriorates. However, since the feedback control is performed as long as the duty command value is obtained using the measured current, the current control performance in a steady state other than the transient state, namely, following capability of the measured current to the current command value is almost equal to the case of performing the correction by the voltage correction unit 504.

Here, the following describes a method for calculating the change factor K by the operation period calculator 510.

To the operation period calculator 510, a semiconductor temperature of the motor controller 111, the rotation speed ω of the motor 104, and the torque command value T* of the motor 104 are input. The operation period calculator 510 determines whether the operation period is changed and the factor K of the operation period after the change on the basis of these inputs. It should be noted that, when the operation period is changed, a value larger than 2 is set to the change factor K.

The larger the change factor K is, the smaller the operation frequency of the switching elements Tr is; therefore, the heat generation amount of the semiconductor chip can be decreased. Therefore, the higher the temperature of the semiconductor chip is, the larger value is set to the change factor K. The closer the absolute value of the rotation speed ω to 0, the heat radiation from the motor 104 is reduced; therefore, the change factor K is set large. The larger the absolute value of the torque command value T* is, the larger value is set to the change factor K.

The operation period calculator 510 outputs the change factor K to the voltage correction unit 504 and a PWM signal generator 506.

A duty conversion unit 505 uses the following Formula (1) to generate duty command values Du*, Dv*, and Dw* on the basis of the after-correction voltage command values Vu*, Vv*, and Vw* and the capacitor voltage Vcap of the capacitor 105 in FIG. 1 and outputs the duty command values Du*, Dv*, and Dw* to the PWM signal generator 506.

[Formula 1]

$$Du^* = \frac{Vu^*}{V_{cap}} + 0.5$$

$$Dv^* = \frac{Vv^*}{V_{cap}} + 0.5 \quad (1)$$

$$Dw^* = \frac{Vw^*}{V_{cap}} + 0.5$$

To the PWM signal generator 506, the duty command values Du*, Dv*, and Dw* and the change factor K are input.

When the operation period needs to be changed, the PWM signal generator 506 performs the process as explained in FIG. 2(c) on the duty command values Du*, Dv*, and Dw*. Specifically, in the first half cycle and the last half cycle, the duty command value is set to the high side or the low side according to the gradient of the carrier wave in the intermediate period. It should be noted that the voltage correction unit 504 corrects the duty command value to the change factor K in the intermediate period. The PWM signal generator 506 compares the carrier wave with the duty command values Du*, Dv*, and Dw* to generate the PWM signal.

Meanwhile, when the operation period needs not to be changed, the PWM signal generator 506 does not perform the process as explained in FIG. 2(c) on the duty command values Du*, Dv*, and Dw* but compares the carrier wave with the duty command values Du*, Dv*, and Dw* to generate the PWM signal. In this case, the voltage correction unit 504 does not correct the duty command value in the intermediate period.

Here, the following describes the gain control process by the current controller 502 with reference to FIG. 6.

FIG. 6 is an explanatory view for the gain control process by the current controller 502.

Figure 6A:
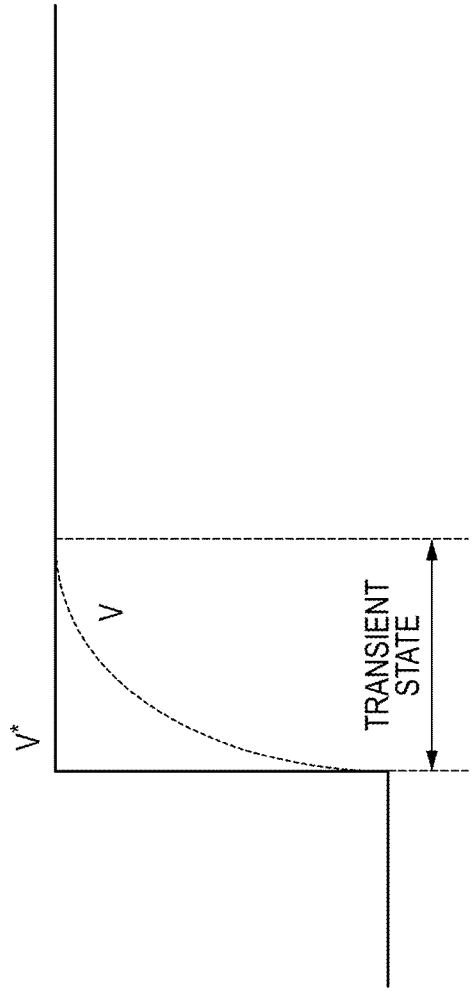
FIG. 6 is an explanatory view of a gain control process.

FIG. 6(a) is a drawing illustrating the command value and the applied voltage when the gain control process is not performed. This diagram indicates a conversion value V* of the voltage command value output from the current controller 502 to the applied voltage to the motor 104 by the solid line and an actual applied voltage V to the motor 104 by the dotted line. It should be noted that, for convenience of explanation, the following gives the description referring the conversion value V* of the voltage command value output from the current controller 502 to the applied voltage to the motor 104 as a voltage command value V*.

A delay time occurs from when the voltage command value V* changes to the target value until the actual applied voltage V becomes the target value. Therefore, as illustrated in this diagram, even if the voltage command value changes so as to form a rectangular shape, the actual applied voltage to the motor does not form the rectangular shape and the time until the actual applied voltage matches the voltage command value is taken. The state until such applied voltage matches the voltage command value is referred to as the transient state.

Figure 6B:
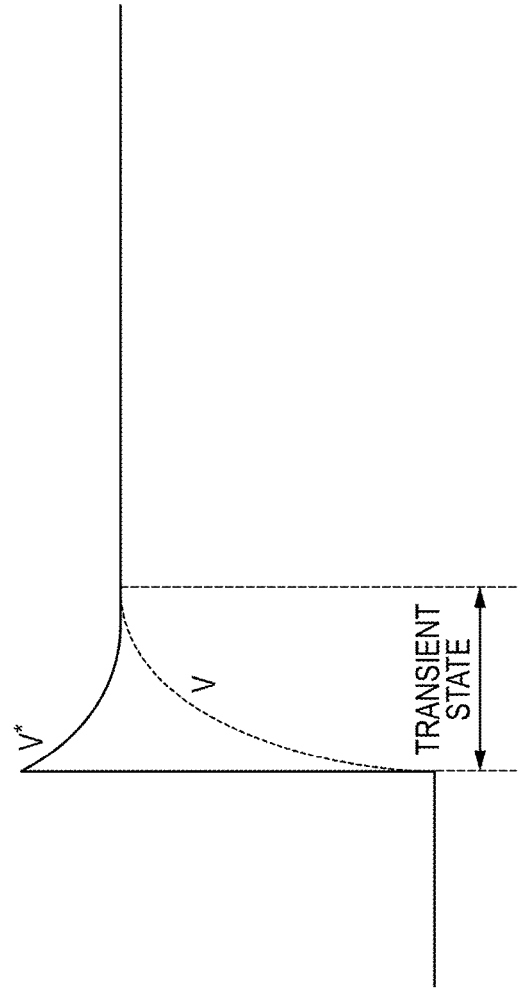

FIG. 6(b) is a drawing illustrating the voltage command value and the applied voltage in the case where the gain control process is performed. This diagram indicates the voltage command value V* when the gain control process is performed by the solid line and the actual applied voltage V to the motor 104 by the dotted line. As illustrated in this diagram, performing the gain control on the voltage command value V* ensures shortening the period in the transient state until the actual applied voltage V to the motor matches the voltage command value V*. It should be noted that FIG. 6(b) is one example of the gain control process and does not limit the method to the method of the illustrated gain control process.

Here, the long operation period lengthens the delay time from the timing at which the voltage command value V* is obtained until the switching elements are actually operated. Therefore, when the gain control process is performed, the period until the applied voltage actually becomes the objective value by the voltage command value V* after the gain control process lengthens. Therefore, for example, with the large amount of gain, if overshooting occurs, the overshooting is amplified, resulting in diffusion of the applied voltage.

Therefore, the current controller 502 decreases the amount of gain as the operation period lengthens (as the change factor K increases) and increases the amount of gain as the operation period shortens. Thus, this ensures shorting the period in the transient state while reducing lengthening the overshooting and dispersing the applied voltage.

The following effects can be obtained by the electric power control method of the first embodiment.

With the electric power control method of the first embodiment, the current sensor 106 performs a current measuring step that measures the current supplied to the motor 104 at the timing at which the carrier wave becomes the maximum or the minimum. Next, the motor controller 111 performs a command value calculating step that calculates the duty command value according to the measured current and the request torque to the motor 104. Next, an operating step that compares the carrier wave with the duty command value in the magnitude and performs the switching operation of the switching elements according to the comparison result is performed.

The motor controller 111 compares the duty command value according to the certain measured current with the carrier wave and performs a determining step that determines whether the change of the operation period during which the operation of the switching elements Tr according to the comparison result is performed is required or not. When the motor controller 111 determines that the temperature of the semiconductor chip is high and the operation period needs to be changed in the determining step, a first reducing step, a comparing step, and a second reducing step are performed.

The first reducing step reduces a switch operation of the switching elements in the first half cycle. The comparing step changes the slope of the carrier wave, compares the carrier wave after the change with the duty command value, and operates the switching elements according to the comparison result in the intermediate period. The second reducing step reduces the switch operation of the switching elements in the last half cycle.

Thus, in the operation period after the change, the switching elements are operated only in the intermediate period. Meanwhile, in the first half cycle and in the last half cycle, the operation of the switching elements Tr is reduced. Accordingly, in the operation period after the change, the switching elements are operated only in the intermediate period, thereby ensuring lowering the operation frequency of the switching elements Tr. Since the increase in the temperature of the semiconductor chip can be reduced, the semiconductor chip can be protected.

Furthermore, in the intermediate period in which the comparing step is performed, the switching elements are operated according to the comparison result between the duty command value calculated in the command value calculating step and the carrier wave. Accordingly, the duty command value compared with the carrier wave in the operation period is not calculated before the operation period but is calculated in the operation period. Therefore, the delay time from when the measurement timing of the current at the current measuring step until the companion between the duty command value according to the measured current and the carrier wave starts can be shorter than the operation period.

The electric power control method of the first embodiment sets one of the maximum value and the minimum value of the carrier wave to the duty command value according to whether the slope of the carrier wave is positive or negative in the intermediate period in the first half cycle. Meanwhile, in the last half cycle, the other maximum value and minimum value of the carrier wave is set to the duty command value. By thus setting the duty command value, the carrier wave and the duty command value do not intersect in the first half cycle and the last half cycle, thereby ensuring reducing the switch operation of the switching elements Tr.

The electric power control method of the first embodiment does not change the frequency of the carrier wave in the first half cycle where the first reducing step is performed and the last half cycle where the second reducing step is performed. Here, depending on the restrictions on the semiconductor chip, there may be a case where the slope of the carrier wave can be changed only at the timing at which the carrier wave becomes the maximum or the minimum. Even such case, since the slope of the carrier wave is not changed in the first half cycle and the last half cycle and the carrier wave changes from one of the maximum value and the minimum value to the other, the gradient of the carrier wave is changeable at the start and the end timings of the intermediate period. Accordingly, the freedom of design can be enhanced.

The electric power control method of the first embodiment uses the duty command value obtained on the basis of the current measured at the start timing of the operation period including the intermediate period in the intermediate period. Therefore, the delay time from the measurement timing of the current until the duty command value according to the measured current is set is equivalent to the time of the first half cycle.

Meanwhile, in the case where the frequency of the carrier wave is changed low like prior art, the delay time from the measurement timing of the current until the duty command value according to the measured current is set is equivalent to the operation period after the change. Therefore, this embodiment allows the delay time from the measurement timing of the current until the duty command value according to the measured current is set to be short, thereby ensuring improving the accuracy of the rotation control of the motor 104.

Additionally, among the timings at which the carrier wave becomes the maximum or the minimum, the current is not measured at timings other than the current measurement timing and the duty command value is not calculated. Therefore, the process load applied to the motor controller can be reduced.

With the voltage control method of the first embodiment, the voltage correction unit 504 performs the correcting step that corrects the three-phase alternating-current voltage command values Vu0*, Vv0*, and Vw0* according to the operation period after the change and the length of the intermediate period. Specifically, in the correcting step, the voltage command value increases by the factor (K/(K−2) times) obtained by dividing the length of the operation period lengthened by the change factor K by the length of the intermediate period.

Since the execution of the comparing step changes the slope of the carrier wave in the intermediate period, the duty ratio does not become the value according to the original duty command value. Therefore, by performing such correcting step, the change in the slope is considered. This ensures setting the duty ratio to the value according to the original duty command value. Accordingly, the switching elements Tr can be operated at the original timing according to the measured current; therefore, the accuracy of the rotation control of the motor 104 can be improved.

The voltage control method of the first embodiment performs a gain controlling step that performs the gain control process according to the change factor K by the current command value calculator 502.

Here, the delay occurs from when the voltage command value changes until the command value matches the actual applied voltage, and this delayed state is referred to as the transient state. To shorten the period in this transient state, the gain control process is performed at the timing of changing the voltage command value. Here, the longer the operation period is, the longer the delay time is. Accordingly, the large gain factor possibly causes the applied voltage to overshoot by the gain control process, resulting in dispersing the voltage. Therefore, by performing the gain control according to the change factor K of the operation period, specifically, setting the amount of gain small in the gain control process as the change factor K increases, the possibility of causing the overshooting can be reduced and the period in the transient state can be short.

The electric power control method of the first embodiment performs the determining step that determines whether the operation period is to be changed or not according to at least one of the temperature of the semiconductor chip, the rotation speed of the motor 104, and the torque command value of the motor 104. A temperature range in which the semiconductor chip is stably operable is determined. Therefore, the operation period is changed with the high measured temperature of the semiconductor chip. The operation period is changed with the low rotation speed by the motor 104. The operation period is changed with the large absolute value of the torque command value T* of the motor 104. Accordingly, if three is a possibility that the temperature of the semiconductor chip exceeds the stably operable temperature range, lowering the operation frequency of the switching elements Tr reduces the heat generation of the semiconductor chip and ensures protecting the semiconductor chip.

Second Embodiment

The first embodiment describes the example where the slope of the carrier wave is not changed in the first half cycle and the last half cycle but the slope is changed only in the intermediate period; however, this should not be construed in a limiting sense. The following describes the case where the slope of the carrier wave is changed also in the first half cycle and the last half cycle similar to the intermediate period and the absolute value of the slope of the carrier wave does not change in the entire section of the operation period.

Figure 7:
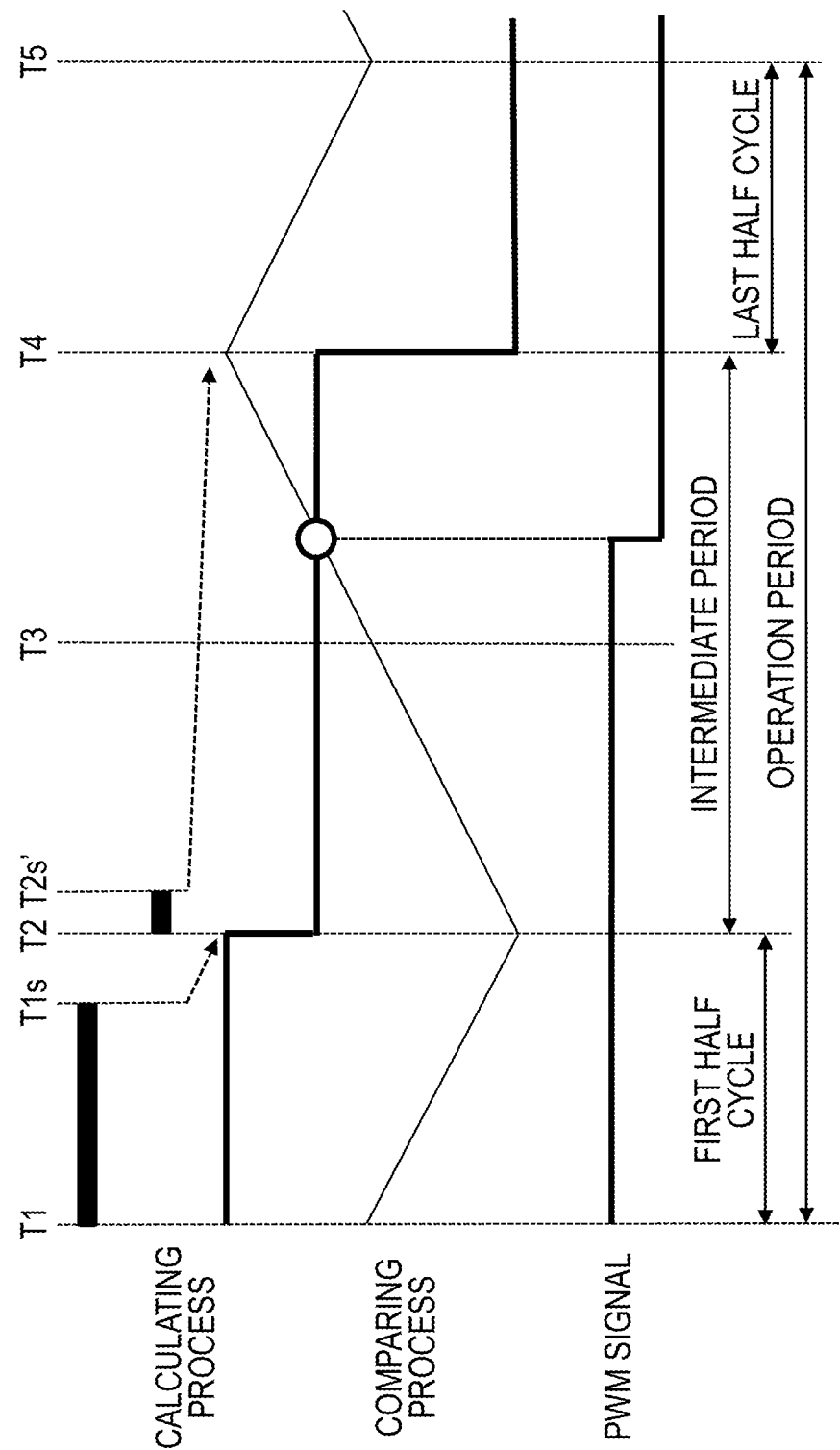
FIG. 7 is an explanatory view for a process to change an operation frequency of switching elements of a second embodiment.

FIG. 7 is an explanatory view for the PWM signal control when the absolute value of the slope in the operation period does not change. This diagram illustrates the PWM signal control in the operation period (the times T1 to T5) with the change factor K of 4.

At the time T1, that is, the timing at which the carrier wave becomes the maximum, the current sensor 106 measures the current. The motor controller 111 uses the measured current and starts calculating the command value.

At the first half cycle of the times T1 and T2, the slope of the carrier wave is changed and the absolute value is equal to the slope of the carrier wave in the intermediate period (the times T2 to T4). Since the slope of the carrier wave in the intermediate period (the times T2 to T4) is positive, the duty command value becomes the maximum value (high side) of the carrier wave. Thus, since the carrier wave and the duty command value do not intersect in the first half cycle, the switch operation of the switching elements Tr is not performed. Simultaneously, at the time T1, the motor controller 111 starts the calculating process of the duty command value between the times T2 to T4.

At the time T1s, the motor controller 111 completes the calculating process of the duty command value.

At the time T2, that is, at the start of the intermediate period, the motor controller 111 starts the comparing process between the duty command value calculated at the time T1s and the carrier wave. It should be noted that the carrier wave monotonously increases from the minimum value to the maximum value in the intermediate period and the carrier wave intersects with the duty command value; therefore, the switch operation of the switching elements Tr is performed. Simultaneously, at the time T2, the motor controller 111 starts the determining process of the duty command value.

At the time T2s', the motor controller 111 completes the determining process of the duty command value. Since the slope of the intermediate period is positive, this determining process determines the minimum value (the low side) of the carrier wave as the duty command value in the last half cycle starting of the time T4. It should be noted that, with the slope of the intermediate period being negative, the maximum value (the high side) of the carrier wave is determined as the duty command value in the last half cycle.

At the time T4, that is, when the intermediate period ends, the motor controller 111 starts comparing the duty command value determined at the time T2s' with the carrier wave.

At the time T5, that is, the timing at which the last half cycle ends and the next operation period starts, the positive or the negative of the gradient of the carrier wave is switched.

Thus, in the operation period after the change (the times T1 to T5), the switching elements Tr are operated only in the intermediate period (the times T2 to T4), and the switching elements Tr are not operated in the first half cycle (the times T1 to T3) and the last half cycle (the times T4 and T5). Since the switching elements Tr are operated at every operation period, four times as long as the half cycle of the carrier wave before the change, the operation frequency can be set to ¼ times.

FIG. 8 is an explanatory view for the changing process of the operation frequency of the switching elements. FIG. 8(a) is an explanatory view of the PWM signal generating process when the operation frequency is not changed. FIG. 8(b) is an explanatory view for the PWM signal generating process when the operation of the switching elements illustrated in FIG. 7 is reduced. This diagram illustrates the PWM signal generating process with the period longer than the period in FIG. 7.

With reference to this diagram, the diagram illustrates that the absolute value of the slope of the carrier wave does not change across the entire section. For example, like the times T5 and T9, the positive and negative of the gradient of the carrier wave is switched at the timing of entering the next operation period from the certain operation period, that is, the timing at which the operation period starts or ends. Such operation can embody the invention according to the embodiments.

The following effects can be obtained by the electric power control method of the second embodiment.

With the electric power control method of the second embodiment, the absolute value of the slope of the carrier wave is equal in the first reducing step, the comparing step, and the second reducing step, and the positive and negative of the slope of the carrier wave is switched at the start timing of the first reducing step.

Thus, the operation frequency of the switching elements Tr can be lowered. Additionally, reducing the frequent change of the absolute value of the slope of the carrier wave ensures reducing the process load applied to the motor controller 111. Depending on the motor controller, although the absolute value of the slope of the carrier wave cannot be frequently changed, there may be a case where the positive and the negative of the slope can be switched at the timing other than the timing at which the carrier wave becomes the maximum value or the minimum value. The present invention can be embodied in this case as well; therefore, the freedom of design can be enhanced.

The embodiments of the present invention described above are merely illustration of some application examples of the present invention and not of the nature to limit the technical scope of the present invention to the specific constructions of the above embodiments. The embodiments can be appropriately combined.

The invention claimed is:

1. An electric power control method that controls an electric power supplied to a motor, the electric power control method comprising:
a current measuring step of measuring a current supplied to the motor at timing at which a carrier wave becomes a maximum or a minimum;
a command value calculating step of calculating a duty command value according to the measured current in the current measuring step and a request torque to the motor;
an operating step of comparing the carrier wave with the duty command value in magnitude while the carrier wave monotonously changes from one of the maximum value and the minimum value to the other, the operating step performing a switching operation of switching elements according to a result of the comparison;
a determining step of determining whether to change an operation period within which the operating step is performed so as to be longer than one cycle of the carrier wave or not;
a first reducing step of reducing the switching operation of the switching elements in a first half cycle of the carrier wave starting from a start timing of the operation period after the change during which the carrier wave monotonously changes when the determining step determines changing the operation period;
a comparing step of changing a slope of the carrier wave in an intermediate period between the first half cycle of the carrier wave and a last half cycle of the carrier wave in the operation period after the change to compare the carrier wave with the duty command value in the magnitude, the comparing step performing the switching operation of the switching elements according to a result of the comparison; and
a second reducing step of reducing the switching operation of the switching elements in the last half cycle of the carrier wave.

2. The electric power control method according to claim 1, wherein
the first reducing step sets one of the maximum value and the minimum value of the carrier wave to the duty command value according to whether the slope of the carrier wave in the intermediate period is positive or negative, and
the second reducing step sets the other to the duty command value.

3. The electric power control method according to claim 1, wherein
the slope of the carrier wave is not changed in the first reducing step and the second reducing step.

4. The electric power control method according to claim 1, wherein:
in the first reducing step, the comparing step, and the second reducing step, an absolute value of the slope of the carrier wave is equal, and
the slope of the carrier wave is switched between the positive and the negative at the start timing of the first reducing step.

5. The electric power control method according to claim 1, wherein
the comparing step compares the duty command value calculated using a current measured at the start timing of the operation period after the change with the carrier wave.

6. The electric power control method according to claim 1, further comprising
a correcting step of correcting the duty command value according to the operation period after the change and a length of the intermediate period.

7. The electric power control method according to claim 1, further comprising
a gain controlling step of performing a gain control according to a change factor of the operation period.

8. The electric power control method according to claim 1, wherein
the determining step determines whether to change the operation period or not according to at least any one of a temperature of a semiconductor chip on which the electric power control method is performed, a rotation speed of the motor, and a torque command value of the motor.

9. An electric power control device comprising:
a current sensor configured to measure a current supplied to a motor at a measurement timing at which a magnitude of a carrier wave becomes a maximum or a minimum; and
a controller configured to measure the current supplied to the motor at the timing at which the carrier wave becomes the maximum or the minimum, the controller being configured to calculate a duty command value according to the measured current and a request torque to the motor, the controller being configured to compare the carrier wave with the duty command value in magnitude while the carrier wave monotonously changes from one of the maximum value and the minimum value to the other, the controller being configured to perform a switching operation of switching elements according to a result of the comparison, wherein the controller:
  is configured to determine whether to change an operation period during which an operating step is performed or not, so as to perform the switching operation of the switching elements;
  reduces the switching operation of the switching elements in a first half cycle of the carrier wave starting from a start timing of an operation period after a change during which the carrier wave monotonously changes when the controller determines changing the operation period;
  is configured to change a slope of the carrier wave in an intermediate period between the first half cycle of the carrier wave and a last half cycle of the carrier wave in the operation period after the change, compare the carrier wave with the duty command value in the magnitude while the changed carrier wave monotonously changes from one of the maximum value and the minimum value to the other, and perform the switching operation of the switching elements according to a result of the comparison; and
  is configured to reduce the switch operation of the switching elements in the last half cycle of the carrier wave.

* * * * *